March 28, 1961 R. H. HILL 2,976,807
ELECTRIC MOTOR-DRIVEN PUMP INSTALLATION
Filed Oct. 2, 1956
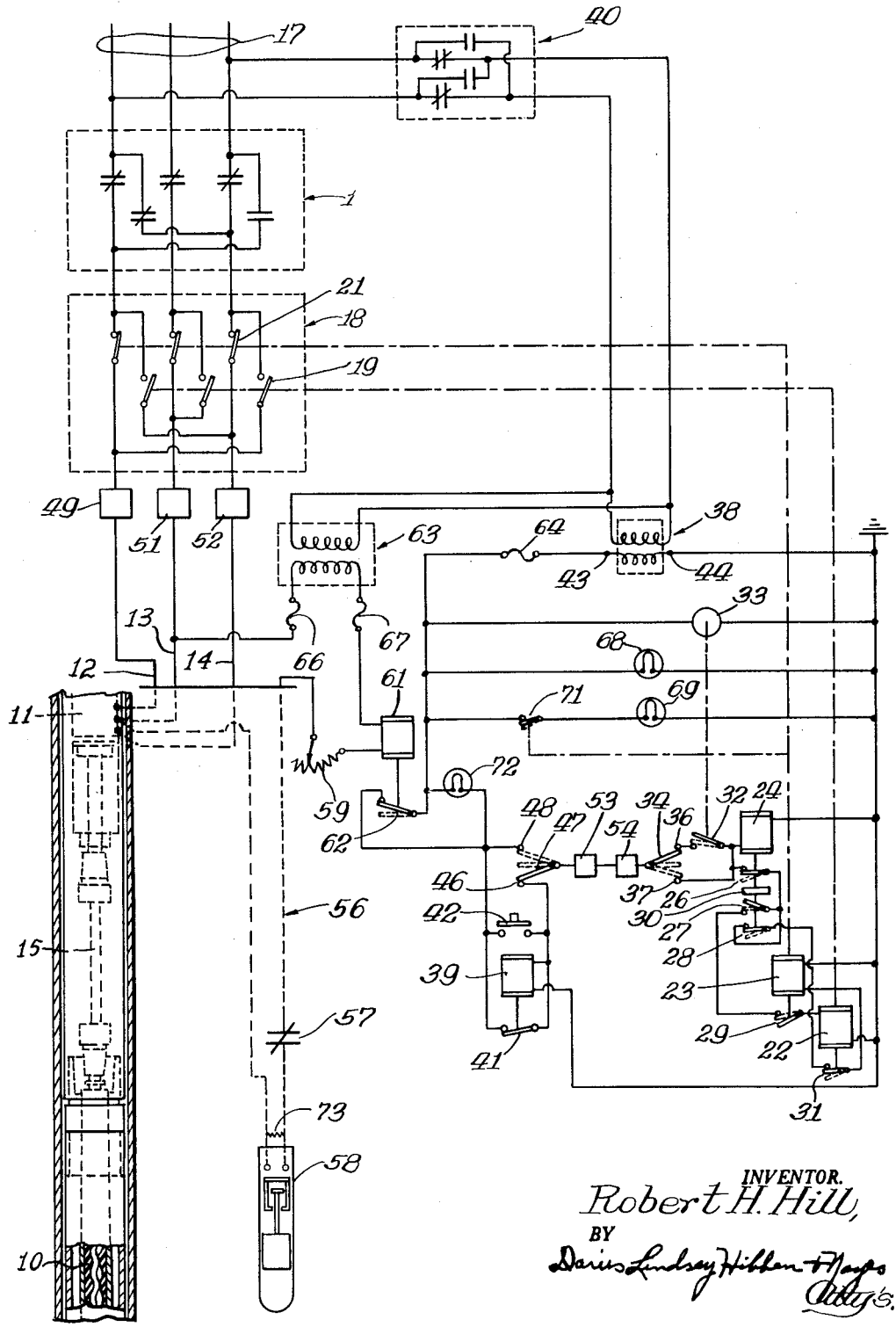
INVENTOR.
Robert H. Hill,
BY

United States Patent Office 2,976,807
Patented Mar. 28, 1961

2,976,807

ELECTRIC MOTOR-DRIVEN PUMP INSTALLATION

Robert H. Hill, Fort Wayne, Ind., assignor to Perfect Circle Corporation, Hagerstown, Ind., a corporation of Indiana Filed Oct. 2, 1956, Ser. No. 613,518

1 Claim. (Cl. 103—11)

This invention relates to electric motor-driven pump installations and more particularly to a mode of starting and controlling an electric motor driven pump.

In pumping installations, a substantial number of the pumps utilized have a tendency for their moving parts to adhere to their stationary parts when idle. In addition, in a number of such installations a marked back pressure is exerted against the pump, and with certain types of pumps such back pressure tends to reversely drive the pump. The coexistence of these factors in an installation creates a situation, after a period of idleness, which seriously hampers starting the pump, because of the excessive starting load. That is, during starting, not only must the pump's prime mover overcome the back pressure against the pump and the inertia of the installation, but it must also break the pump's moving parts loose from their adhering condition.

The situation described becomes particularly critical in many present day oil well installations. In a number of those installations pumps known commercially as Moineau pumps have been used. These pumps are a progressing cavity type pump having a rubber-like stator element and an elongated helical rotor element. When so employed they are normally disposed near the bottom of the well, and the rotor element has a particularly strong tendency to adhere to the stator element after a period of idleness, because of the relatively large area of contact between stator and rotor. Furthermore, oil wells are normally deep, extending many hundreds of feet into the earth. Such depths necessarily create tremendous back pressures on pumps disposed near the bottom of such wells and which are employed to lift oil from the well to the surface. With a Moineau type pump, such back pressure has a strong reverse driving effect.

The prime mover employed in such a well is normally an electric motor disposed adjacent the pump in the well. Understandably, to start an adhering pump against the back pressure and inertia of a substantial head of oil in such an installation calls for an abnormally high starting torque, which in turn, calls for a huge surge of current to the motor during starting. Such power demands during starting would require a motor of substantially larger size than that required for the normal pumping operation. Further, such surges of current to the motor would be uneconomical and probably harmful to the motor windings and other electrical equipment.

It is, therefore, a primary object of this invention to provide a novel mode of starting an electric motor-driven pump, which will require a minimum of electric power during starting.

Another object is to provide a novel motor controller for starting and controlling an electric motor-driven pump.

Another object is to provide a novel electric motor-driven pump installation having a controller for starting and controlling the installation in a manner to reduce the electric power requirements during starting.

Still another object is to provide a novel motor controller for starting and controlling an electric motor-driven pump in such a manner as to reduce the electric power requirements during starting and which provides for automatically programmed operation.

A further object is to provide a novel motor controller for starting and controlling an electric motor-driven pump in such a manner as to reduce the electric power requirements during starting and which is provided with protective devices for protecting the installation against harmful or otherwise undesirable factors.

Another object is to provide a novel motor controller for starting and operating an electric motor-driven pump in such a manner as to reduce the electric power requirements during starting and which protects the installation against low voltage operation.

A still further object is to provide a novel motor controller for starting and operating an electric motor-driven pump in such a manner as to reduce the electric power requirements during starting and which is provided with indicators for indicating the operative status of various elements of the installation.

Another object is to provide a novel motor controller for starting and operating a three phase electric motor-driven pump.

Other objects and advantages of the invention will become apparent from the subsequent description taken in conjunction with the accompanying drawing wherein:

The drawing is a diagrammatic representation of one specific embodiment of the invention.

In general, this invention provides a mode for starting which comprises first reversely starting the motor and thereafter operating it forwardly. The back pressure, instead of being an additional load for the motor to overcome in initial starting as is the case in conventional starting, would in effect be an aiding force to the motor. Thus, initially the motor is aided by the back pressure in overcoming the inertia and breaking loose the adhering parts of the pump. After the initial reverse starting of the units, they are then started and operated forwardly. Having no adhering pump elements to break loose, the starting torque for forward operation need be only sufficient to overcome the inertia and build up the necessary pressure. Hence it is seen that the maximum starting power is greatly reduced and with it, the current surge to the motor. Further, current demands will be maintained at a minimum during the second phase of the sequence, if the initial phase is maintained only momentarily, that is, only sufficiently long to break loose the elements of the pump without causing substantial downward pumping movement of the fluid being pumped.

This same principle of momentary reverse starting may be used to advantage in installations which may or may not have the counter force effect of the back pressure, but which do have marked back-lash, or play, between motor and driven unit. Momentary reversal of the motor on starting, in this instance, permits the motor to take up the play in the reverse direction in order to get a running start forwardly before picking up the load. This running start reduces the current surge on starting, in that the momentum gained by the motor enables it to overcome, at least in part, the inertia of the driven unit. Furthermore, an electric motor having attained some speed requires less current to satisfy a given power demand than does one that is not moving.

Referring to the drawing, one specific embodiment of the invention is illustrated in diagrammatic form. Those elements of the installation which are adapted to be located below ground level are shown connected by dashed lines representing electrical connections to the elements above ground. This embodiment comprises a pump unit 10, such as the Moineau pump described generally above, and an electric motor 11, which are adapted to be located adjacent the bottom of a well. A driving connection 15 is provided between the motor 11 and pump 10. Necessarily, because of the mode of connection and the length of the connecting links illustrated, a measurable amount of play or back-lash may exist between motor and pump.

The motor 11, in this instance, is shown as a three-phase electric motor, but it is to be understood that any reversible electric motor having power sufficient for such an installation could be utilized. The motor is connected to a power source in the conventional manner, having three power conductors 12, 13 and 14 for conducting the three-phase current to the motor. They are shown connected to motor 11 below ground level. Above ground level the conductors 12, 13 and 14 are shown connected to a manually operable drum switch 16, and the drum switch is shown connected to a three-phase power line 17.

Not infrequently after the motor has been installed it is found that the incoming power lines have been connected so as to cause the motor to run in reverse. To provide for this eventuality, drum switch 16 provides a means for readily reversing the connections of two of the conductors to the line 17 for normally forward operation, as is well understood in the art. In this instance, connections of conductors 12 and 14 to the line are reversible, leaving the connection of conductor 13 undisturbed.

To accomplish the desired reversed starting sequence described above, the installation is provided with a novel controller. In general the controller comprises a reversing switch means interposed in the motor circuit, that is, in conductors 12, 13 and 14, and a device for actuating the switch means for reverse starting and thereafter for forward operation, in a timed sequence. In the instant embodiment the switch means comprises switch elements of a power relay 18. Relay 18 has two banks of switches 19 and 21 and each bank has three switch elements, each bank being operable to close or open all its elements in unison, and each bank being normally open. Bank 21 is shown closing the motor circuit in "straight through" relation, as when the motor pump unit is being operated forwardly. On the other hand, bank 19 is shown open and is wired to effect a reversal of the connections of conductors 12 and 14 to line 17 when bank 19 is closed, thus to effect reverse operation of motor 11. The drawing shows the various elements of the installation as they would be found when the motor 11 is operating forwardly, after momentarily reversed starting has occurred and forward operation has begun.

The device for actuating the switch means in timed sequence, in the instant case, comprises relay means, and more specifically, relay elements 22 and 23 which constitute a part of power relay 18, and a timed relay 24. Relay element 22 is operatively connected to switch bank 19 so that when element 22 is energized, bank 19 is closed and likewise relay element 23 is operatively connected to switch bank 21 so that when element 23 is energized, bank 21 is closed. Timed relay 24 is operatively associated with relay elements 22 and 23 and provides a means for obtaining their sequenced and timed functioning during the first portion of every starting and operating cycle.

A number of types of timed relays may be adapted to serve as a means for effecting energization of elements 22 and 23 in a timed sequence, but in this embodiment of the invention relay 24 is of the air dash pot type having an air dash pot delaying element 30. In this instance, relay 24 actuates three switches which it operates in a timed sequence. The first switch 26 is normally open and is connected in series with the other two switches 27 and 28, switch 27 being normally closed and switch 28 being normally open, and the switches 27 and 28 being connected to operate simultaneously. Switches 27 and 28 are connected in series with the coils of relay elements 22 and 23, respectively. Delaying element 30 is adjusted so that relay 24 upon being energized will first close switch 26 for energizing relay element 22, which in turn closes switch bank 19 for reversely starting unit 11. Momentarily thereafter timed relay 24 opens switch 27 and closes switch 28, while holding switch 26 closed, deenergizing relay element 22 to open switch bank 19 and energizing relay element 23 to close switch bank 21. Thus, the reverse operation of the motor 11 is stopped and it is then started and operated forwardly. The entire starting cycle is made to occur in accordance with a predetermined timed sequence by proper adjustment of timed relay 24.

The motor controller is provided with interlock means to prevent the simultaneous closing of switch banks 19 and 21. In this instance the interlock is electrical and comprises switches 29 and 31 which are normally closed. Switch 29 is connected in series with the coil of relay element 22 and is actuated to open when element 23 is energized, while switch 31 is connected in series with the coil of relay element 23 and is actuated to open when element 22 is energized.

It is often desirable in pumping operations to follow a planned pumping program, and this is particularly true in oil well operations. The instant controller provides a means for automatic operation in accordance with a planned program of pumping. Not only may the programming be automatically accomplished, but also during each start-up during the program, the reversed starting cycle is utilized. This programming feature of the controller is accomplished by providing a device which, when being utilized, effects the energization and deenergization of the timed relay 24 in accordance with the predetermined program. In this instance, the device comprises a switch 32 which is opened and closed by an electrically operated clock 33. In addition, a means for selectively operating the pump with and without the automatic programming features is provided. That means comprises a switch 34 having two contacts 36 and 37. Contact 36 is connected in series with switch 32 and contact 37 is connected as a shunt around the switch 32 to the coil of timed relay 24. Thus it is seen that, when switch 34 is closed on contact 36, switch 32 is in the timed relay circuit and the controller is operable according to the program set on clock 33, and when switch 34 is closed on contact 37, switch 32 is shunted and the controller is operable manually by moving switch 34 between contact 37 and an intermediate "off" position.

It is desirable that a major portion of the elements of the controller circuit be energized from the same source. A practical mode of providing such a source is illustrated in the drawing, wherein a transformer 38 is shown with its primary connected to two of the wires of the motor line 17. Although shown connected through a transformer reversing switch 40, transformer 38 could be connected directly to the line, and is connected in this fashion only to reduce the total number of connections with the line. The secondary of transformer 38 is connected to supply the current for energizing the various circuit elements. The embodiment shown, contemplates a 440 volt 3 phase motor line with transformer 38 arranged to step down the voltage to a value suitable for controller circuit use, such as 110 volts.

While a number of equivalent variations in the manner of interconnecting the various elements of the controller circuit may be used, the drawing illustrates one specific manner in which a network of parallel connections permit the various elements of the circuit to perform their respective functions while being energized by the common source, transformer 38. For example, clock 33 is connected in parallel with the various relay elements, and in particular with timed relay 24, so that the clock will continue to operate even when relay 24 has been deenergized by the opening of any of the switches in series with it. This mode of connecting is fundamental and well understood in the art.

In a device of the character contemplated by this invention and which is to be utilized in the environment of a type similar to that described, it is essential that measures be taken for protecting the installation against harmful and otherwise undesirable conditions that may develop during operation. To this end a number of protective elements has been provided. Thus, because substantial fluctuations in line voltage may be encountered as a normal operational incident, and, inasmuch as operation during a low voltage condition may be harmful, a means for protecting the installation against a low voltage condition is provided. The embodiment of the invention shown is adapted to afford two modes of low voltage protection. The primary low voltage protection device provided comprises a relay 39 which is sensitive to motor line voltage and actuates a normally open holding switch 41. Switch 41 is connected in the controller circuit in such a fashion that it effects energization and deenergization of timed relay 24. When the voltage in the motor line drops below a predetermined minimum, switch 41, in response to action by relay 39, is opened to deenergize the timed relay 24 and thus shuts off the motor 11. In the instant embodiment relay 39 is interposed in the controller circuit as shown, rather than in the motor power circuit. It is responsive to low voltage in the power circuit because the voltage in the controller circuit is proportional to power circuit voltage, by virtue of their interconnecting link, transformer 38. A start button 42 and holding switch 41 are each connected between one terminal of the coil of relay 39 and one terminal 43 of the secondary of transformer 38. The other terminal of the coil of relay 39 is connected to the other terminal 44 of the secondary of transformer 38. The one terminal of the coil of relay 39, connected to start button 42 and holding switch 41 is also connected to a contact 46 of a switch 47. Switch 47 is in turn connected to the terminal 44 through switch 34 and through the coils of relays 22, 23 and 24. When relay 39 is included in the timed relay circuit by the closing of switch 47 on contact 46, it serves as the low voltage protector, and the unit is started by depressing start button 42 to close the circuit through the coil of relay 39. Relay 39 being thus energized, closes, and holds closed, switch 41 as long as the current through it remains sufficiently high. Being in parallel with switch 41, start button 42 is released without disrupting the current flow through the coil of relay 49. However, in the event the voltage in the circuit drops below a predetermined level, relay 39 will become insufficiently energized to hold the switch 41 closed and upon the opening of switch 41 due to this fact, the circuit is opened and consequently the motor stopped. Because of this particular arrangement of elements, it is seen that once relay 39 has been deenergized to stop the motor, the motor may be restarted again only by manually operating start button 42.

Additional low voltage protection is obtained by designing other of the relays in the circuit for deenergizing the motor when the voltage drops below a predetermined minimum. In the instant case, timed relay 24 is designed to drop out for deenergizing the motor when the voltage drops sufficiently low and thus it affords a secondary low voltage protection. Switch 47 is provided with another contact 48 connected to terminal 43 of the transformer 38. With this arrangement it may be seen that switch 47 provides a means for selectively including and excluding the relay 39, its associated start button 42 and switch 41 from the timed relay circuit. When relay 39 is out of the timed relay circuit, that is, when switch 47 is closed on contact 48, timed relay 24 functions as the low voltage protector. When timed relay 24 has functioned as the low voltage protector to stop the motor, as soon as the voltage again reaches operating level, the unit will be automatically restarted. Thus both automatic restarting and manual restarting are available but it should be understood that no matter which mode is being used during a particular operation, upon restarting the starting cycle previously discussed will be effected.

To protect against an overload condition is as important as it is to protect against a low voltage condition. To that end, overload circuit breakers 49, 51 and 52 are interposed in conductors 12, 13 and 14, respectively, in the instant embodiment, and are operatively interconnected with normally closed switches 53 and 54, so as to cause one or both of the said switches 53 and 54 to open upon the functioning of the circuit breakers, thus effecting deenergization of relays 22, 23 and 24. The circuit breakers 49, 51 and 52 are preferably of the type which must be manually reset before operation of the unit may be resumed.

An additional protective device is provided in the instant embodiment of this invention. The device is of a character adapted to be disposed in a well and which has elements sensitive to variable characteristics in the well. It has means for effecting deenergization of the timed relay 24 when any of said characteristics reaches a predetermined limit. Two such characteristics are the level of the fluid in the well and the temperature of some critical element, such as the motor. In the specific embodiment illustrated, the additional protective device comprises an electrical circuit 56 extending below ground level and having connected therein in series a thermal responsive element 57 and an element 58 which is responsive to fluid level. Each of the elements 57 and 58 is designed to interrupt a current flowing through it when the characteristic to which it is sensitive reaches its preestablished limit. The circuit 56 also includes a variable resistance 59 and a relay 61 connected in series with the elements 57 and 58 and are both adapted to be located at ground level.

The variable resistance 59 is provided as a means for balancing the circuit for use in different wells, or at different depths in a well, that is, because of the varying lengths of conductors involved, resistance in the protective circuit will vary substantially. By properly adjusting the variable resistor element 59, the circuit can be balanced, or calibrated, to suit the particular installation.

Relay 61 provides the protective circuit with the means for deenergization of timed relay 24 when any protective element in the circuit 56 functions to interrupt current flow therein. As shown, its coil is interposed in circuit 56 and it is provided with a switch element 62 interposed in the controller circuit between switch 47 and terminal 43 of transformer 38. It is seen that when current flow in circuit 56 is substantially interrupted, relay 61 drops out actuating switch element 62 to deenergize timed relay 24 and thus stop the motor 11.

Circuit 56 is shown, in this instance, as incorporating a portion of conductor 13 for completing the circuit to the source of current, the secondary of a transformer 63. This arrangement permits the use of one less lead than is normally utilized in such an installation. The primary of transformer 63 is shown connected through the transformer reversing switch 40, in common with transformer 38, to those portions of line 17 connected to conductors 12 and 14. As shown, the connection of conductors 12 and 14 to the line is subject to reversal through the operation of drum switch 16 and power relay 18 while that of conductor 13 is not. The transformer reversing switch 40 is provided so that the voltage supplied by the secondary of transformer 63 can be maintained as additive to the line drop voltage in conductor 13.

It is common practice to provide a circuit with protective fuse elements for protecting the circuit and its elements against the contingency of a high power surge. To this end the controller circuit is provided with fuse 64, and the protective circuit 56 is provided with fuses 66 and 67.

Particularly in the case where a number of elements in an installation may be located remotely from the central control means, it is desirable that the installation be provided with means for indicating functioning and malfunctioning of various elements of the installation. The controller here shown is provided with a number of such indicators, which in the main, comprise indicating lamps. Thus, lamp 68 is connected to the terminals 43 and 44 of the secondary of transformer 38 and it, therefore operates whenever the transformer is energizing. Lamp 69 is also connected to terminals 43 and 44, but a normally open switch 71 is interposed between the lamp and one of the terminals. Switch 71 is operatively connected to relay 23 to close when relay 23 is energized. It thus indicates forward operation of the motor. An additional lamp 72 is connected around switch 62. When switch 62 is closed lamp 72 is shunted out of the circuit, but when switch 62 is open, lamp 72 is in the circuit and will operate, thus indicating that some element in the protective circuit 56 has functioned to shut down operations. The resistance of the lamp 72 in the instant embodiment is sufficiently high to limit the current flow to an amount below that necessary for the functioning of the relays. As an aid to determining which protective element in the well is functioning upon operation of lamp 72, a high resistance element 73 is connected around one of the elements, in this instance element 58, to maintain a small current in the circuit when element 58 functions to interrupt current flow. In the event that it becomes desirable to determine which element is functioning, the use of a sensitive ammeter or an ohmmeter in the circuit would enable one to quickly identify the open element, in that if a current is found flowing, or a resistance is measured, element 58 is functioning, and if the circuit is found open, element 57 is functioning.

From the above it is seen that this invention affords a novel mode of starting an electric motor-driven pump. It also affords a novel mode of controlling the operation of an electric motor-driven pump installation. The modes of starting and of controlling the installation are effected by a novel controller together with an arrangement of the elements in the installation, which affords a means whereby the motor-pump units are, during every starting cycle, first started reversely and thereafter operated forwardly. During operation, the invention also provides protection against a great number of factors which may be harmful to, or undesirable in, the installation, and provides means whereby the installation may be selectively controlled either manually or automatically in accordance with a pre-established program of operation.

Although the invention has been described in connection with a certain specific structural embodiment, it is to be understood that various modifications and alternative structure may be resorted to without departing from the scope of the invention as defined in the appended claim.

I claim:

In combination, a well pump of the Moineau type having a movable part and a complementary stationary part and in which said movable part tends to adhere to said stationary part when the pump is idle, a submersible motor connected to said movable part for driving the same, said motor and pump being adapted to be located adjacent the bottom of a well, and means controlling said motor and pump, said controlling means including means for momentarily starting said motor and pump in the reverse direction and immediately thereafter starting and operating said motor and pump in the forward direction each time said motor and pump are started, whereby any fluid above said pump aids said motor in loosening said movable part from said stationary part.

References Cited in the file of this patent

UNITED STATES PATENTS

| | | |
|---|---|---|
| 652,168 | Dearing | June 19, 1900 |
| 724,224 | Wiechmann | Mar. 31, 1903 |
| 1,841,601 | Higbee | Jan. 19, 1932 |
| 2,094,807 | Newill | Oct. 5, 1937 |
| 2,094,811 | Pierce | Oct. 5, 1937 |
| 2,106,685 | Smith | Jan. 25, 1938 |
| 2,518,597 | Brooks | Aug. 15, 1950 |
| 2,634,390 | Kennedy et al. | Apr. 7, 1953 |
| 2,661,697 | Long et al. | Dec. 8, 1953 |
| 2,690,713 | Urmann et al. | Oct. 5, 1954 |
| 2,778,313 | Hill | Jan. 22, 1957 |